US011144353B2

(12) United States Patent
Troester

(10) Patent No.: US 11,144,353 B2
(45) Date of Patent: Oct. 12, 2021

(54) SOFT WATERMARKING IN THREAD SHARED RESOURCES IMPLEMENTED THROUGH THREAD MEDIATION

(71) Applicant: Advanced Micro Devices, Inc., Santa Clara, CA (US)

(72) Inventor: Kai Troester, Boxborough, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 9 days.

(21) Appl. No.: 16/585,586

(22) Filed: Sep. 27, 2019

(65) Prior Publication Data

US 2021/0096914 A1 Apr. 1, 2021

(51) Int. Cl.
G06F 9/50 (2006.01)
(52) U.S. Cl.
CPC .................. G06F 9/5005 (2013.01)
(58) Field of Classification Search
CPC .................................... G06F 9/5005
See application file for complete search history.

(56) References Cited

U.S. PATENT DOCUMENTS

| 7,360,064 | B1 | 4/2008 | Steiss et al. |
| 8,087,029 | B1 | 12/2011 | Lindholm et al. |
| 8,347,309 | B2 | 1/2013 | Smolens et al. |
| 2005/0141554 | A1 | 6/2005 | Hammarlund et al. |
| 2008/0250233 | A1 | 10/2008 | Marden et al. |
| 2010/0299499 | A1* | 11/2010 | Golla ............... G06F 9/3824 712/206 |
| 2011/0029978 | A1 | 2/2011 | Smolens |
| 2014/0282589 | A1 | 9/2014 | Kuang et al. |
| 2014/0351568 | A1* | 11/2014 | Wang ................ G06F 9/3851 712/239 |
| 2020/0183744 | A1 | 6/2020 | Kim |
| 2021/0096920 | A1 | 4/2021 | Troester |

OTHER PUBLICATIONS

Tullsen, "Exploiting Choice: Instruction Fetech and Issue on an Implementable Simultaneous Multithreading Processor", dated 1996, 12 pages.
Mars, Jason, "Multiprocessors and Multithreading", dated Mar. 3, 3013, 60 pages.
The International Searching Authority, "Search Report" in application No. PCT/US2020/050388, dated Dec. 9, 2020, 14 pages.
European Patent Office, "Search Report", in application No. PCT/US2020/049220, dated Nov. 23, 2020, 12 pages.
European Claims in application No. PCT/US2020/049220, dated Nov. 2020, 7 pages.
Current Claims in application No. PCT/US2020/05038, dated Dec. 2020, 5 pages.

* cited by examiner

*Primary Examiner* — Sisley N Kim
(74) *Attorney, Agent, or Firm* — Hickman Becker Bingham Ledesma LLP; Edward A. Becker

(57) ABSTRACT

Techniques for use in a microprocessor core for soft watermarking in thread shared resources implemented through thread mediation. A thread is removed from a thread mediation decision involving multiple threads competing or requesting to use a shared resource at a current clock cycle based on a number of entries in the shared resource that the thread is estimated to have allocated to it at the current clock cycle. By removing the thread from the thread mediation decision, the thread is stalled from allocating additional entries in the shared resource.

17 Claims, 5 Drawing Sheets

| Clock Cycle | Thread 1 | Thread 2 | Thread 3 |
|---|---|---|---|
| 0 | | S | |
| 1 | | S | |
| 2 | S | R | |
| 3 | S | R | |
| 4 | | | S |
| 5 | | S | |
| 6 | | R | S |

Time →

Figure 3

| Clock Cycle | AT | AC | Thread 2 SC | AA | AE = AC + (SC * AA) |
|---|---|---|---|---|---|
| 0 | 40 | 35 | 0 | 2 | 35 |
| 1 | 40 | 35 | 1 | 2 | 37 |
| 2 | 40 | 37 | 2 | 2 | 41 |
| 3 | 40 | 37 | 2 | 2 | 41 |
| 4 | 40 | 35 | 1 | 2 | 37 |
| 5 | 40 | 37 | 0 | 2 | 37 |
| 6 | 40 | 39 | 1 | 2 | 41 |

- AT: Allocation Target
- AC: Allocation Count
- SC: Selection Count
- AA: Assumed Per-Selection Allocation
- AE: Allocation Estimate Time →

Figure 4

SOFT WATERMARKING IN THREAD SHARED RESOURCES IMPLEMENTED THROUGH THREAD MEDIATION

CROSS-REFERENCE TO RELATED APPLICATIONS

This application is related to U.S. patent application Ser. No. 16/585,424, filed Sep. 27, 2019, entitled "SHARED RESOURCE ALLOCATION IN A MULTITHREADED MICROPROCESSOR".

BACKGROUND

At the hardware-level, a multithreaded microprocessor core can execute hardware instructions of different threads at the same time. Often, the different threads share resources. Various components of microprocessor pipelines can include shared resources that are competitively shared by multiple threads. Some examples of such shared resources include computing units, load queues, reservation stations, L1 and L2 caches, translation lookaside buffers, etc.

The level of parallelism present in a microprocessor can apply pressure on shared resources within a microprocessor core. For example, between two and eight threads, or more, may compete for a load queue, a reservation station, a register file, or an arithmetic logic unit (ALU). As another example, multiple threads may be pending allocation of entries in a load queue prior to being issued to an execution unit. The pressure on shared resources caused by the level of parallelism can lead to hazards. Thread mediation schemes for sharing resources such as round-robin and least-recently-used (LRU) can be employed to mitigate this.

However, simple thread mediation schemes such as round-robin and LRU may not be sufficient. Long latency operations for a thread such as, for example, loads that miss the L1 and L2 caches, can cause the thread to accumulate an unfair share of a shared resource and be slow to deallocate its share. Similarly, instruction dependencies and register dependencies can also cause a thread to accumulate an unfair share of a shared resource while it waits for the dependencies to be fulfilled. Such threads are sometimes referred to "poor use" threads. A poor use thread can result when a thread is allocated a disproportionately greater share of a shared resource than the thread is actively using. Under certain processor workloads, allocation of the shared resource to a poor use thread can significantly lower the throughput for other threads.

Embodiments described herein address these and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood routine or conventional, merely by virtue of their inclusion in this section.

BRIEF DESCRIPTION OF THE DRAWINGS

In the drawings:

FIG. 3 depicts an example of thread mediation decisions in a table form, according to some possible implementations.

FIG. 4 illustrates a soft watermarking example in a table form, according to some possible implementations.

DETAILED DESCRIPTION

Figure 1:
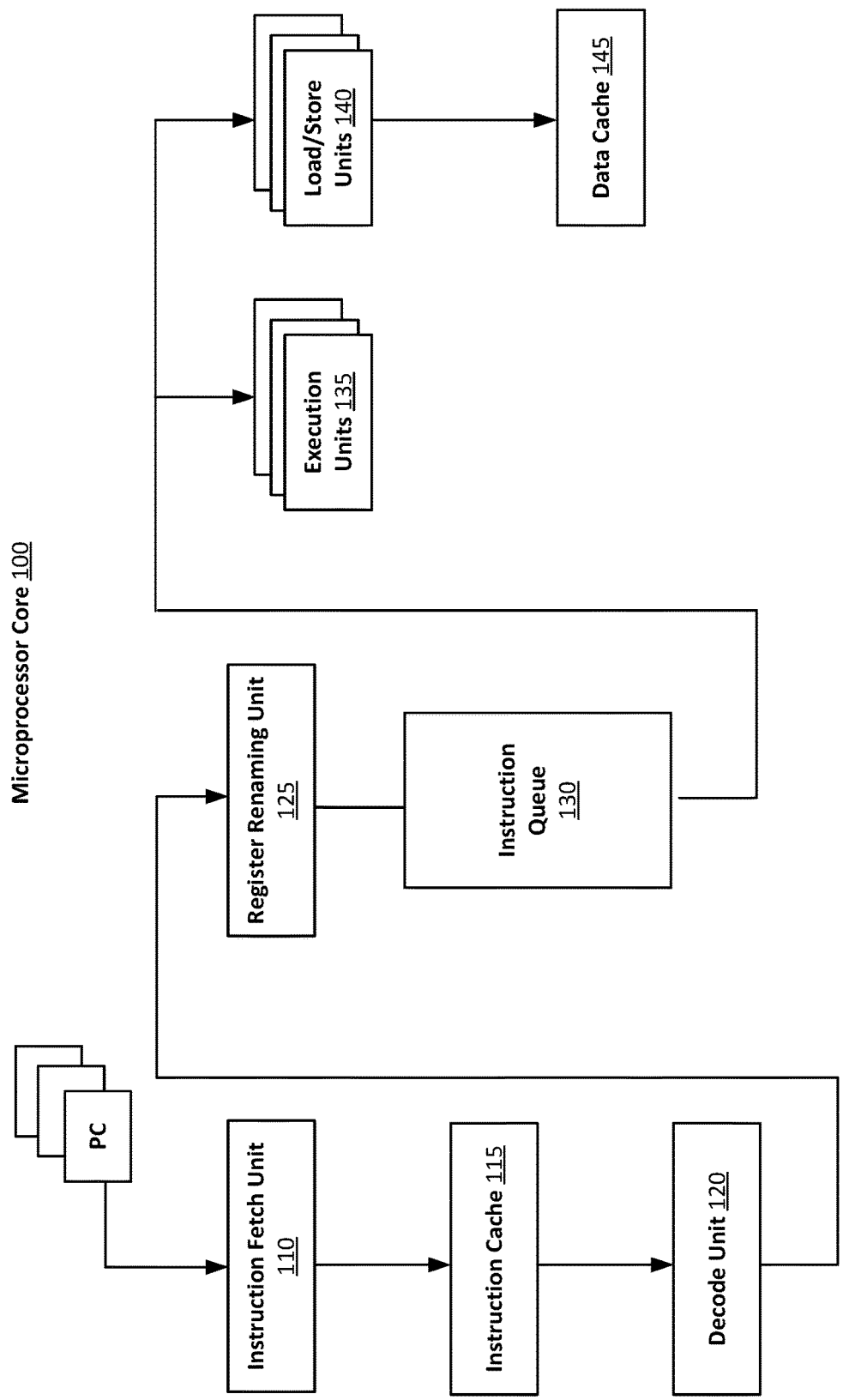
FIG. 1 schematically depicts an example microprocessor core that may use techniques for soft watermarking in thread shared resources implemented through thread mediation, according to some possible implementations.

In the following description, for the purposes of explanation, numerous specific details are set forth in order to provide a thorough understanding of the present application. It will be apparent, however, that the embodiments described herein may be practiced without these specific details. In other instances, some structures and devices are shown in block diagram form in order to avoid unnecessarily obscuring certain features.

General Overview

Techniques for use in a microprocessor for soft watermarking in thread shared resources implemented through thread mediation are disclosed. The techniques, in some embodiments, allow for control of thread selection based on the number of entries allocated to a thread in a shared resource and a static or dynamically adjusted allocation target for the thread. The techniques, in some embodiments, also allow for bridging clock cycles between when a thread selection is made to use a shared resource and when an actual allocation count for the thread is updated by considering expected resource allocation by the thread when the thread selection is made before the actual allocation count for the thread is updated. By considering expected resource allocation when the thread selection is made, large oscillations in resource allocation are prevented where there are a substantial number of clock cycles between the thread selection and when the actual allocation count for the thread is updated.

In some possible implementations, for example, a microprocessor has a shared resource. The shared resource has a plurality of entries for use by a plurality of threads. The microprocessor also encompasses thread mediation logic. The thread mediation logic determines an allocation estimate for each thread of the plurality of threads. The allocation estimate may be an estimate of the cardinality of a set of entries, of the plurality of entries, that the thread is consuming at a current clock cycle at which a thread mediation decision is made. The estimate may be a good enough estimate of the number entries of the shared resource that the thread will be consuming at the future clock cycle without incurring the additional complexity and cost associated with hardware circuitry for generating a more accurate estimate.

The thread mediation logic also determines whether the allocation estimate satisfies (e.g., equals or exceeds) an allocation target. The allocation target may be the cardinality of a should-not-exceed number of entries, of the plurality of entries of the shared resource, that the thread is allocated at the current clock cycle.

The thread mediation logic removes the thread from a thread mediation decision based on a determination that the allocation estimate for the thread satisfies (e.g., equals or exceeds) the allocation target. By removing the thread from the thread mediation decision, the thread is stalled from allocating additional entries in the shared resource and potentially preventing the thread from becoming a poor use thread. After the current clock cycle, if the then allocation estimate for the thread does not satisfy the then allocation target, then the thread may then be included in a thread mediation decision such that it is no longer stalled from allocating entries in the shared resource.

These and other possible implementations will become more apparent upon reference to the following description and the accompanying figures.

Example Microprocessor Core

FIG. 1 schematically depicts example microprocessor core 100 that uses techniques for soft watermarking in thread shared resources implemented through thread mediation, according to some possible implementations. Core 100 is a multithreaded central processing unit (CPU), the core of a single-core multithreaded microprocessor, or one core of a multi-core multithreaded microprocessor. Core 100 utilizes known processor design techniques including, but not limited to, superscalar architecture, simultaneous multithreading, fine-grained multithreading, speculative execution, branch prediction, out-of-order execution, and/or register renaming.

Core 100 includes circuitry for executing instructions according to a predefined instruction set architecture. For example, the predefined instruction set architecture may be any of: x86®, ARM®, PowerPC®, MIPS®, Sparc®, RISC-V®, or other complex or reduced instruction set architecture.

Core 100 supports execution of multiple threads. A given thread may include a set of instructions that may execute independent of instructions of another thread. Core 100 may concurrently execute instructions of a number of threads such as, for example, between two and eight concurrently executing threads.

Core 100 is capable of efficiently processing varying types of computational workloads across of a continuum of workload types from workloads that are more I/O-bound (e.g., workloads that are network and/or file system bound) to workloads that are more processor-bound (e.g., workloads involving cryptography, computer graphics, or intensive mathematical analysis).

Core 100 dynamically allocates shared resources among multiple threads. Such shared resources may include, but are not limited to, branch resources (e.g., branch predictor structures), load/store resources (e.g., load/store buffers and queues), instruction completion resources (e.g., reorder buffers and commit logic), instruction issue resources (e.g., instruction selection and scheduling structures, reservation stations), register renaming resources (e.g., register mapping tables), and/or memory management unit resources (e.g., translation lookaside buffers, page walk resources).

A non-exclusive set of hardware components that may be included in core 100 include instruction fetch unit 110, instruction cache 115, decode unit 120, register renaming unit 125, instruction queue 130, execution units 135, load/store units 140, and data cache 140. Other components not shown in FIG. 1 that may be included in core 100 may include, but are not limited to, prefetch buffer, branch prediction logic, global/bimodal logic, loop logic, indirect jump logic, loop stream decoder, micro instruction sequencer, retirement register file, register allocation table, reorder buffer, reservation station, arithmetic logic unit, and/or memory order buffer.

Example Multithreaded Microprocessor Core

Figure 2:
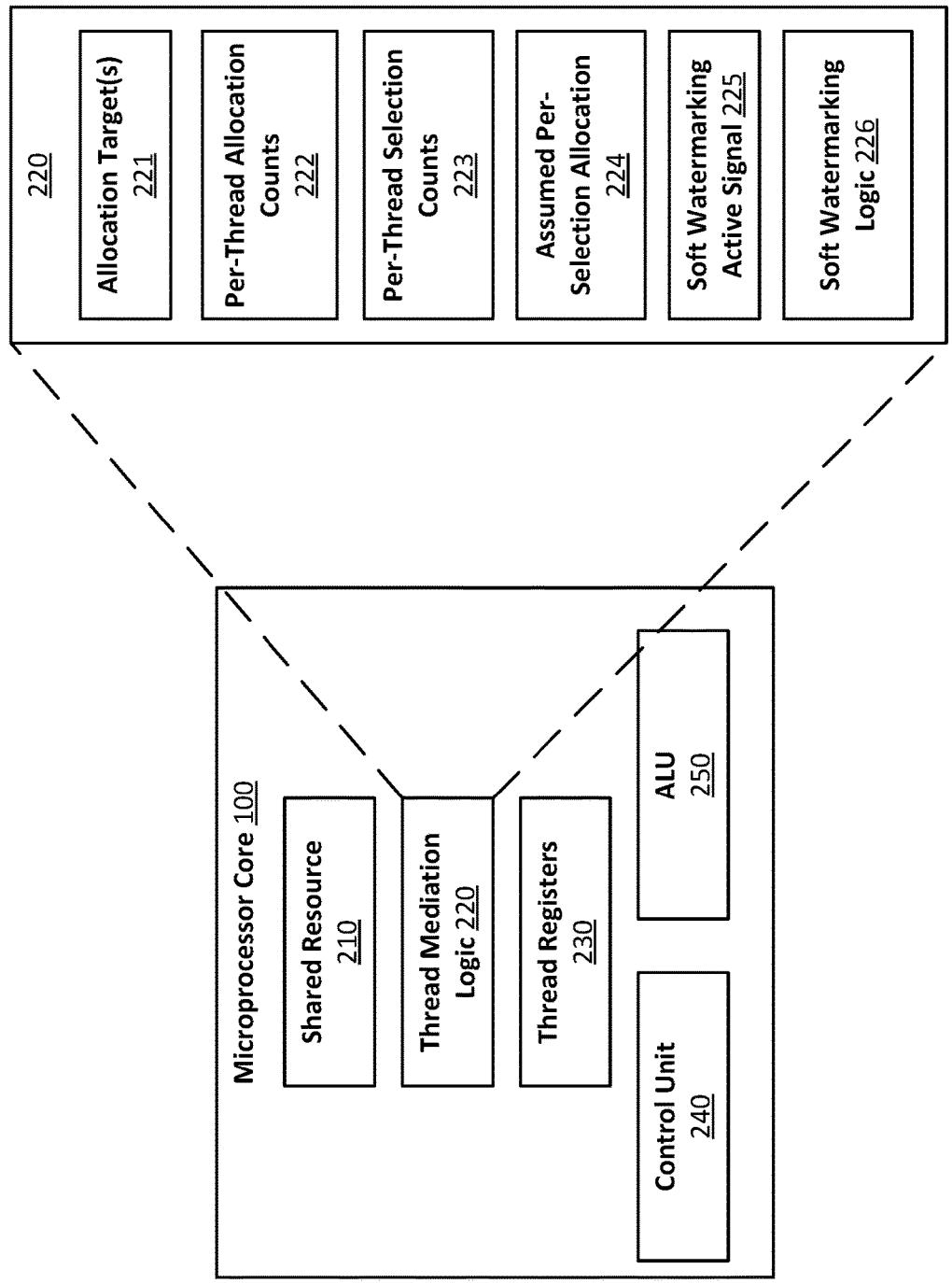
FIG. 2 is a block diagram of example multithreaded microprocessor core that may use techniques for soft watermarking in thread shared resources implemented through thread mediation, according to some possible implementations.

FIG. 2 is a block diagram that depicts example multithreaded microprocessor core 100 of FIG. 1 that includes shared resource 210, thread mediation logic 220, thread registers 230, control unit 240 and arithmetic logic unit (ALU) 250. The thread registers 230 are registers that are dedicated to particular threads. Core 100 may support any number of threads and implementations are not limited to any particular number of threads. The shared resource 210 may be any type of resource that is used by multiple threads in the multithreaded microprocessor core 100. Examples of the shared resource 210 include, without limitation, a load queue, a register file, a reservation station, etc.

The thread mediation logic 210 mediates requests from threads to allocate entries in the shared resource 140 in accordance with soft watermarking, as described in more detail hereinafter. The thread mediation logic 220 may be implemented by computer hardware, computer software, or any combination of computer hardware and software. The thread mediation logic 220 is depicted in FIG. 2 as a separate element for discussion purposes only and the thread mediation logic 220 may be incorporated into other elements within the multithreaded microprocessor core 100, for example resource allocation logic, thread switching logic, and dispatch restriction logic. The multithreaded microprocessor core 100 may include additional elements that are not depicted in FIG. 2 and that may vary from implementation to implementation.

In some possible implementations, thread mediation logic 220 for shared resource 210 includes one or more allocation target(s) 221, per-thread allocation counts 222, per-thread selection counts 223, assumed per-selection allocation 224, soft watermarking active signal 225, and soft watermarking logic 226. Allocation target(s) 221, per-thread allocation counts 222, per-thread selection counts 223, assumed per-selection allocation, soft watermarking active signal 225, and/or soft watermarking logic 226 may be dedicated to shared resource 210, or one or more, or all of them, shared amongst multiple shared resources. Allocation target(s) 221, per-thread allocation counts 22, and per-thread selection counts 223 may be stored and maintained in one or more registers of core 100.

Soft watermarking signal 225 may be set to active or inactive at a current clock cycle. For example, programmed instructions being executed by core 100 may set soft watermarking signal 225 to active or inactive. The setting may apply for just the current clock cycle or for multiple clock cycles that include the current clock cycle.

According to some embodiments, if signal 225 is active at the current clock cycle, then soft watermarking logic 226 computes an allocation estimate for each thread of a plurality of threads requesting to use shared resource 210 at the current clock cycle. The allocation estimate for a thread may be computed based on allocation target(s) 221, per-thread allocation counts 222, per-thread selection counts 223, and assumed per-selection allocation 224. In general, however, allocation target(s) 221 can be per-thread or global for all threads that use the shared resource 210. Allocation target(s) 221 can be configured statically or dynamically. For example, allocation target(s) 221 can adjust dynamically and automatically based on detecting how threads use shared resource 210. In general, however, an allocation target may reflect a should-not-exceed number of entries in shared resource 210 that are allocated to a thread at the current clock cycle. Per-thread allocation counts 222 reflect the number of entries in shared resource 210 that each thread has allocated at a clock cycle, which may be a few clock cycles behind the current clock cycle. Per-thread selection counts 223 may reflect the number of times each thread was selected to use shared resource 210 during a past window of clock cycles. Assumed per-selection allocation may be empirically or heuristically determined as a number of entries a thread is expected to allocate in shared resource 210 each time a thread is selected to use shared resource 210 as a result of a thread mediation decision.

In some embodiments, soft watermarking logic 226 computes the allocation estimate for a thread at the current clock cycle as: (1) the per-thread allocation count of counts 222 for the thread at the current clock cycle (which may be a few cycles behind the actual number of entries allocated in shared resource 210 to the thread at the current clock cycle) plus (2) the per-thread selection count of counts 223 for the thread at the current clock cycle multiplied by (3) the assumed per-selection allocation 224. If the computed allocation estimate for the thread satisfies an allocation target (e.g., a global allocation target for shared resource 210 or a thread-specific allocation target for the thread and shared resource 210), then soft watermarking logic 226 removes the thread from the thread mediation decision at the current clock cycle. Otherwise, the thread remains eligible for thread mediation at the current clock cycle.

On the other hand, if signal 225 is not active at the current clock cycle, then soft watermarking logic 226 removes the thread from the thread mediation decision at the current clock cycle based on the allocation count of counts 222 for the thread. For example, if the allocation count for the thread at the current clock cycle satisfies an allocation target (e.g., a global allocation target for shared resource 210 or a thread-specific allocation target for the thread and shared resource 210), then soft watermarking logic 226 removes the thread from the thread mediation decision at the current clock cycle. Otherwise, the thread remains eligible for thread mediation at the current clock cycle.

In some embodiments, soft watermarking logic 226 allows for control of thread selection based on the number of entries allocated to a thread in shared resource 210 and a static or dynamically adjusted allocation target 221 for the thread. Soft watermarking logic 226 also allows for bridging clock cycles between when a thread selection is made to use shared resource 210 and when actual allocation count 222 for the thread is updated by considering expected resource allocation by the thread when the thread selection is made before actual allocation count 222 for the thread is updated. For example, the expected resource allocation may be based on selection count 223 for the thread and assumed per-selection allocation 224. By considering expected resource allocation when the thread selection is made, large oscillations in resource allocation in shared resource 210 are prevented where there are a substantial number of clock cycles (e.g., three or more) between the thread selection and when actual allocation count 222 for the thread is updated.

Soft Watermarking

In a multithreaded processor core, multiple threads may compete with each other to use a shared resource such as, for example, a load queue, a reservation station, or a register file. Use of a shared resource by a thread may include allocating one or more entries in the shared resource into which instructions for the thread can be written. For example, in the case of a load queue, the instructions may include load instructions for loading data from memory to registers. An entry in a shared resource may be allocated to a thread for only a few clock cycles or for an extended number of clock cycles. After an entry in the shared resource is no longer allocated to a thread, it becomes available again to be allocated to a thread including, possibly, the thread that just deallocated the entry.

There are a variety of reasons for why an entry may be allocated to a particular thread for an extended number of clock cycles. Some of the reasons include, for example, a cache miss or a dependency of an instruction on another instruction or a register. If a thread has too many entries allocated in a shared resource over an extended number of clock cycles, the thread may be poorly using the shared resource. For example, the thread may be allocating additional entries in the shared resource for instructions that are not yet ready to be committed, retired, processed or dispatched because of instructions of entries previously allocated by the thread that are still pending commit, retirement, processing, or dispatch because of, for example, a cache miss or instruction or register dependency. Meanwhile, another thread could have used those additional entries for instructions that are ready to be processed or dispatched sooner.

The soft watermarking techniques disclosed herein prevent a thread from allocating additional entries in a shared resource when it is estimated that the thread satisfies (e.g., equals or exceeds) an allocation target if the thread were allowed to allocate the additional entries. The thread may be prevented from doing this by removing the thread from a thread mediation decision at the current clock cycle at which the thread mediation decision is made. Because the thread is removed from the thread mediation decision, it is not selected to use the shared resource at the current clock cycle. Consequently, the thread is not able to allocate additional entries in the shared resource beyond what is already allocated to the thread at the current clock cycle.

At a next and subsequent clock cycles, an allocation estimate is made again for the thread. The thread is included in the thread mediation decision at a subsequent clock cycle if the allocation estimate then does not satisfy (e.g., is below) an allocation target. By removing a thread from a thread mediation decision when the allocation estimate for the thread satisfies (e.g., equals or exceeds) an allocation target, the number of entries in the shared resource that the thread can allocate is limited. This may be done temporarily if it is detected that the thread is using the shared resource poorly, or to prevent the thread from using the shared resource poorly. As a result, the overall throughput of the shared resource is improved for certain workloads.

Due to delays in the microprocessor, there may be a number of clock cycles (e.g., three) between (a) the thread mediation decision at the current clock cycle and (b) when an allocation count maintained in the microprocessor for the thread and the shared resource is updated to reflect the number of entries in the shared resource allocated to the thread at the current clock cycle. This lag may result from the manner in which the microprocessor processes instructions in pipeline stages. In particular, the pipeline stage in the microprocessor in which the thread mediation decision is made for the shared resource may be a few clock cycles before the pipeline stage at which an allocation count. Thus, at the current clock cycle when the thread mediation decision is made, the number of entries the thread has actually allocated in the shared resource may not be known at the current clock cycle. Hence, an allocation estimate for a thread is made to roughly estimate the number of entries the thread has allocated at the current clock cycle. The allocation estimate is then used at the current clock cycle to determine whether the thread should be removed from the thread mediation decision at the current clock cycle.

Clock Cycle

As used herein, the term "clock cycle" refers to a period of time associated with two consecutive pulses of an oscillator (e.g., a crystal oscillator) of a multithreaded microprocessor, unless the context clearly indicates otherwise. The start of a period of time associated with a clock cycle may be triggered or caused by a first pulse of the oscillator and the end of the period of time associated with the clock cycle may be triggered or caused by the next pulse of the oscillator.

Reference may made herein to various events occurring "at" a clock cycle. As used herein, reference to an event occurring "at" a clock cycle refers to an event that occurs at least during a period of time associated with the clock cycle, unless the context clearly indicates otherwise.

Reference is also made herein to various states existing "at" a clock cycle. As used herein, reference to a state existing "at" a clock cycle refers to a state that exists at least during a period of time associated with the clock cycle, unless the context clearly indicates otherwise.

Likewise, reference to an event occurring "before" or "after" a clock cycle refers to an event that occurs at least before a period of time associated with the clock cycle or at least after a period of time associated with the clock cycle, respectively, unless the context clearly indicates otherwise.

Similarly, reference to a state existing "before" or "after" a clock cycle refers to a state that exists at least before a period of time associated with the clock cycle or a state that exists at least after a period of time associated with the clock cycle, respectively, unless the context clearly indicates otherwise.

Past Clock Cycle Windows

In some possible implementations, the allocation estimate for a thread is based on recent usage of the shared resource by the thread. The recent usage can be over a window of two or more recent consecutive clock cycles. For example, at the current clock cycle at which the allocation estimate is being made for a thread, the estimate can be based on the thread's usage of the shared resource over a number of previous consecutive clock cycles. The number of previous consecutive clock cycle on which the estimate is based can be, but is not required to be, equal to the number of clock cycles that the allocation count for the thread and the shared resource lags behind the current clock cycle. For example, the allocation estimate can be based on the three previous consecutive clock cycles. Accordingly, the term "past window" refers to two or more previous consecutive clock cycles relative to the current clock cycle, unless the context clearly indicates otherwise.

Allocation Target

As used herein, the term "allocation target" refers to a should-not-exceed number of entries of a shared resource no more than should be allocated to a single thread at the current clock cycle. This number can include any entries allocated to the thread during previous clock cycles that are still allocated to the thread at the current clock cycle.

The allocation target can be based on the total number of entries in the shared resource. For example, if the total number of entries in a load queue is fifty (50), then the allocation target can also be fifty (50).

However, the allocation target can be less than the total number of entries in the shared resource. For example, the allocation target can be statically predefined as a number of entries less than the total number of entries of the shared resource. For example, the allocation target can be one-half or one-third or other fraction of the total number of entries of the shared resource.

The allocation target can be a per-thread target for the shared resource or can be a "global" allocation target for all threads using the shared resource. In other words, the allocation target can be the same value for all threads using the shared resource or different individual values for different individual threads using the shared resource. If per-thread, then the allocation target can vary for different threads.

It is also possible for a per-thread or global allocation target to adjust dynamically in response to usage of the shared resource. For example, a per-thread allocation target for a particular thread can be lowered dynamically from a current allocation target based on detecting that the particular thread is using the shared source poorly (i.e., is a poor use threads). Likewise, the allocation target can be raised based on detecting that the particular thread is no longer a poor use thread with respect to the shared resource. Some possible techniques for dynamically adjusting an allocation target based on the usefulness of a shared resource to threads are described in related U.S. patent application Ser. No. 16/585,424, filed Sep. 27, 2019, entitled "SHARED RESOURCE ALLOCATION IN A MULTI-THREADED MICROPROCESSOR".

Satisfying an Allocation Target

Reference is made herein to an allocation estimate that "satisfies" or "does not satisfy" an allocation target. As used herein, reference to an allocation estimate that satisfies an allocation target means that the allocation estimate equals or exceeds the allocation target, unless the context clearly indicates otherwise. Whether the allocation estimate is required to exceed the allocation target in order to satisfy the allocation target, and not merely equal the allocation target, may be an implementation choice made according to the requirements of the particular implementation at hand.

In some possible implementations, the allocation estimate equals or exceeds the allocation target and is considered to satisfy the allocation target.

In other possible implementations, the allocation estimate must exceed the allocation target to be considered to satisfy the allocation target and merely being equal to the allocation target is not sufficient to satisfy the allocation target.

In some possible implementations, whether an allocation estimate that is equal to an allocation target satisfies the allocation target depends on whether a prior allocation estimate exceeded the allocation target. For example, a current allocation estimate that is equal to an allocation target satisfies the allocation target if the prior allocation estimate exceeded the allocation target. Alternatively, the current allocation estimate may be considered to not satisfy the allocation target in that situation.

Thread Mediation Decision

At the current clock cycle, a thread mediation decision may be made to determine which one of multiple threads competing or requesting to use a shared resource are selected to use the shared resource. The thread mediation decision can be made according to a variety of different approaches and the present application is not limited to any particular thread mediation approach. For example, a round-robin or least recently used approach may be used.

A thread may be removed from a thread mediation decision based on an allocation estimate for the thread satisfying an allocation target. The thread mediation decision is then made among the remaining threads that were not removed from the thread mediation decision. For example, a round-robin or least recently used approach may be used to select one of the remaining threads. As another alternative, the thread mediation decision may select the remaining thread having the lowest allocation count at the current clock cycle to use the shared resource. As mentioned above, this allocation count may lag behind the current clock cycle by a few clock cycles. Thus, the allocation count for the selected thread reflects the actual number of entries allocated to the thread a few cycles ago, which may not be the actual number of entries allocated to the thread at the current clock cycle. For example, the selected thread may have fewer or more entries allocated to it at the current clock cycle. As yet another alternative, the thread mediation decision may select the remaining thread having the lowest allocation estimate at the current clock cycle.

It is possible for multiple threads to be removed from a thread mediation decision at the current clock cycle because each of their allocation estimates satisfy an allocation target. In this case, if there are multiple remaining threads, then the thread mediation decision can be made among the remaining threads (e.g., according to a round-robin, LRU, lowest allocation count, or lowest allocation estimate approach). If there is only one thread remaining, then that thread can be selected to use the shared resource at the current clock cycle.

It should be noted that not all threads may request or compete to use the shared resource at the current clock cycle. For example, some of the threads may not request to use the shared resource at the current clock cycle. Thus, another reason the thread mediation decision at the current clock cycle may not involve all threads is because some of the threads do not request to use the shared resource at the current clock cycle.

It is also possible for all threads to be removed from a thread mediation decision at the current clock cycle because each of their allocation estimates satisfy an allocation target. In this case, a fallback mediation approach may be used. The fallback approach can be round-robin, least recently used, lowest allocation count, or lowest allocation estimate.

It is also possible for a thread to be removed from a thread mediation decision at the current clock cycle for reasons other than an allocation estimate for the thread satisfying an allocation target. For example, a thread may be removed from a thread mediation decision because the thread is not ready allocate entries in the shared resource, or because it is in a stall state.

It is also possible for no threads to be removed from a thread mediation decision at the current clock cycle. For example, each thread's allocation estimate may not satisfy an allocation target at the current clock cycle. In that case, all threads participate in the thread mediation decision at the current clock cycle assuming they otherwise qualify for participation.

Allocation Count

In some possible implementations, the number of entries a thread is allocated in a shared resource is tracked at the current clock cycle at which a thread mediation decision is made. This number of entries is sometimes referred to herein as the "allocation count" for the thread.

In some possible implementations, if the allocation count for a thread satisfies an allocation target, then the thread is removed from the thread mediation decision at the current clock cycle. The thread's allocation count may be updated at each clock cycle and evaluated at each clock cycle at which a thread mediation decision is made. In some possible implementations, a thread's allocation count lags behind, by a number of clock cycles, the number of entries allocated to the thread at the current clock cycle. This lag may result from the nature of pipeline stage processing in the microprocessor. For example, the number of clock cycles behind may be one, two, or three clock cycles. As a result, the number of entries allocated to the thread at the current clock cycle is not reflected by the allocation count for the thread until the number of clock cycles after the current clock cycle. Techniques disclosed herein account for this lag by determining an allocation estimate as described in greater detail elsewhere herein.

Selection Count

In some possible implementations, the number of times a thread is selected to use a shared resource during a past window is tracked at the current clock cycle at which a thread mediation decision is made. This number of times is sometimes referred to herein as the "selection count" for the thread. For example, if a past window encompasses three clock cycles and a thread was selected to use the shared resource for two of the three clock cycles during the past window, then the selection count for the thread at the current clock cycle may be two.

In some possible implementations, if the sum of the allocation count and the selection count for a thread satisfies an allocation target, then the thread is removed from the thread mediation decision at the current clock cycle. The thread's selection count may be updated at each clock cycle based on a sliding past window. For example, the thread's selection count may reflect the number of times the thread has been selected to use a shared resource in the previous three clock cycles.

Assumed Per-Selection Allocation

In some possible implementations, an "assumed per-selection allocation" is taken into consideration as part of a thread mediation decision at the current clock cycle. The assumed per-selection allocation is the number of entries a thread is assumed to have allocated each time the thread was selected to use the shared resource during the sliding past window at the current clock cycle.

The assumed per-selection allocation can be statically defined. For example, assumed per-selection allocation can be between one (1) and four (4) entries. In some possible implementations, the assumed per-selection allocation is heuristically or empirically determined. For example, the assumed per-selection allocation can be statically defined as two (2).

The assumed per-selection allocation can also be tracked on a per-thread basis. For example, the assumed per-selection allocation for a thread can be the average per-cycle allocation for each clock cycle during a past window in which the thread was selected to use the shared resource.

In some possible implementations, if the sum of: (a) the allocation count for a thread at the current clock cycle (which may lag the actual number of entries allocated to the thread at the current clock cycle) and (b) the product of the selection count for the thread and the assumed per-selection allocation satisfies an allocation target, then the thread is removed from the thread mediation decision at the current clock cycle.

Soft Watermarking Example

An allocation estimate for a thread can be made at the current clock cycle. There are a number of different possible ways to make the allocation estimate.

In one possible way, the allocation estimate is made based on the allocation count for the thread. For example, the allocation estimate can be the allocation count at the current clock cycle.

In another possible way, the allocation estimate is made based on the allocation count and the selection count for the thread. For example, the allocation estimate can be the sum of the allocation count for the thread and the selection count for the thread at the current clock cycle.

In yet another possible way, the allocation estimate is made based on the allocation count for the thread, the selection count for the thread, and an expected per-cycle allocation. For example, the allocation estimate can be: (allocation count for the thread at the current clock cycle) plus (selection count for the thread at the current clock cycle multiplied by an expected per-cycle allocation). The expected per-cycle allocation can be statically defined as an expected per-cycle allocation tracked for the thread at the current clock cycle.

FIG. 3 depicts an example of thread mediation decisions over seven consecutive clock cycles in a table form, according to some possible implementations. In this example, three threads are involved. However, as few as two threads, or more than three threads (e.g., four or eight) can be involved in thread mediation decisions for a shared resource in a multithreaded microprocessor. It should be noted that not all threads may request to use the resource at each clock cycle. If a thread does not request to use the shared resource at the current clock cycle, then the thread is not involved in the thread mediation decision at the current clock cycle, and thus is not removed from the thread mediation decision at the current clock cycle according to the soft watermarking techniques disclosed herein. In FIG. 3, an "S" is used to designate that the corresponding thread was selected to use the shared resource at the corresponding clock cycle. An "R" is used to designate that the corresponding thread was removed from thread mediation decision at the corresponding clock cycle. In both cases, the corresponding thread may have requested to use the shared resource at the corresponding clock cycle. Where a table cell is empty in the table for a corresponding thread and a corresponding clock cycle, the corresponding thread may have requested to use the shared resource at the corresponding clock cycle but was not selected to use the shared resource at the corresponding clock cycle and was not removed from the thread mediation decision at the corresponding clock cycle, or the corresponding thread may not have requested to use the shared resource at the corresponding clock cycle.

At Clock Cycle 0, Thread 2 is selected to use the shared resource. Thread 2 is selected again to use the shared resource at Clock Cycle 1. At Clock Cycle 2, Thread 2 is removed from the thread mediation decision at Clock Cycle 2 because Thread 2's allocation estimate at Clock Cycle 2 satisfies an allocation target. Also at Clock Cycle 2, Thread 1 is selected to use the shared resource. Thread 2 is removed from the thread mediation decision at Clock Cycle 3 because Thread 2's allocation estimate at Clock Cycle 3 satisfies an allocation target. Also at Clock Cycle 3, Thread 3 is selected to use the shared resource. At Clock Cycle 4, Thread 1 is selected to use the shared resource. At Clock Cycle 5, Thread 2 is selected to use the shared resource. At Clock Cycle 6, Thread 2 is removed from the thread mediation decision because Thread 2's allocation estimate at Clock Cycle 6 satisfies an allocation target. Also at Clock Cycle 6, Thread 3 is selected to use the shared resource.

Each time a thread is selected to use the shared resource, one or more additional entries may be allocated in the shared resource for the selected thread. Those additional allocations may be reflected in the allocation count for the thread some number of clock cycles (e.g., three) after the thread is selected to use the shared resource at the current clock cycle. Entries in the shared resource allocated to a thread may also be no longer allocated to the thread (deallocated) when the instructions in the entries are processed, dispatched, committed, or retired.

FIG. 4 depicts a soft watermarking example in table form using the example thread mediation decisions of FIG. 3, according to some possible implementations. In this example, the past window size is three clock cycles. That is, for the current clock cycle, the past window for the current clock cycle includes the previous three clock cycles relative to the current clock cycle.

The example of FIG. 4 shows the information tracked and the soft watermarking calculation for just Thread 2. Similar information and similar soft watermarking calculations are tracked and performed for Thread 1 and Thread 3 in the example of FIG. 3.

At Clock Cycle 0, Thread 2 has an allocation target of 40, an allocation count of 35, a selection count of 0, and an assumed per-selection allocation of 2. The allocation estimate for Thread 2 at future Clock Cycle 3 is computed as 35. Since the allocation estimate of 35 does not satisfy the allocation target of 40, Thread 2 is included in the thread mediation decision at Clock Cycle 0.

At Clock Cycle 1, Thread 2 has an allocation target of 40, an allocation count of 35, a selection count of 1, and an assumed per-selection allocation of 2. The allocation estimate for Thread 2 at future Clock Cycle 4 is computed as 37. Since the allocation estimate of 37 does not satisfy the allocation target of 40, Thread 2 is not removed from the thread mediation decision at Clock Cycle 1.

At Clock Cycle 2, Thread 2 has an allocation target of 40, an allocation count of 37, a selection count of 2, and an assumed per-selection allocation of 2. The allocation estimate for Thread 2 at future Clock Cycle 5 is computed as 41. Since the allocation estimate of 41 satisfies the allocation target of 40, Thread 2 is removed from the thread mediation decision at Clock Cycle 2.

At Clock Cycle 3, Thread 2 has an allocation target of 40, an allocation count of 37, a selection count of 2, and an assumed per-selection allocation of 2. The allocation estimate for Thread 2 at future Clock Cycle 6 is computed as 41. Since the allocation estimate of 41 satisfies the allocation target of 40, Thread 2 is not included in the thread mediation decision at Clock Cycle 3.

At Clock Cycle 4, Thread 2 has an allocation target of 40, an allocation count of 35, a selection count of 1, and an assumed per-selection allocation of 2. The allocation estimate for Thread 2 at future Clock Cycle 7 (not shown) is computed as 37. Since the allocation estimate of 37 does not satisfy the allocation target of 40, Thread 2 is included in the thread mediation decision at Clock Cycle 4.

At Clock Cycle 5, Thread 2 has an allocation target of 40, an allocation count of 37, a selection count of 1, and an assumed per-selection allocation of 2. The allocation estimate for Thread 2 at future Clock Cycle 8 (not shown) is computed as 37. Since the allocation estimate of 37 does not satisfy the allocation target of 40, Thread 2 is not removed from the thread mediation decision at Clock Cycle 5.

At Clock Cycle 6, Thread 2 has an allocation target of 40, an allocation count of 39, a selection count of 1, and an assumed per-selection allocation of 2. The allocation estimate for Thread 2 at future Clock Cycle 9 (not shown) is computed as 41. Since the allocation estimate of 41 satisfies the allocation target of 40, Thread 2 is removed from the thread mediation decision at Clock Cycle 6.

In this example, the allocation target remained constant. However, as mentioned, the allocation target may dynamically adjust lower and higher over clock cycles based on the usefulness of the shared resource to the threads in some possible implementations.

Example Soft Watermarking Process

Figure 5:
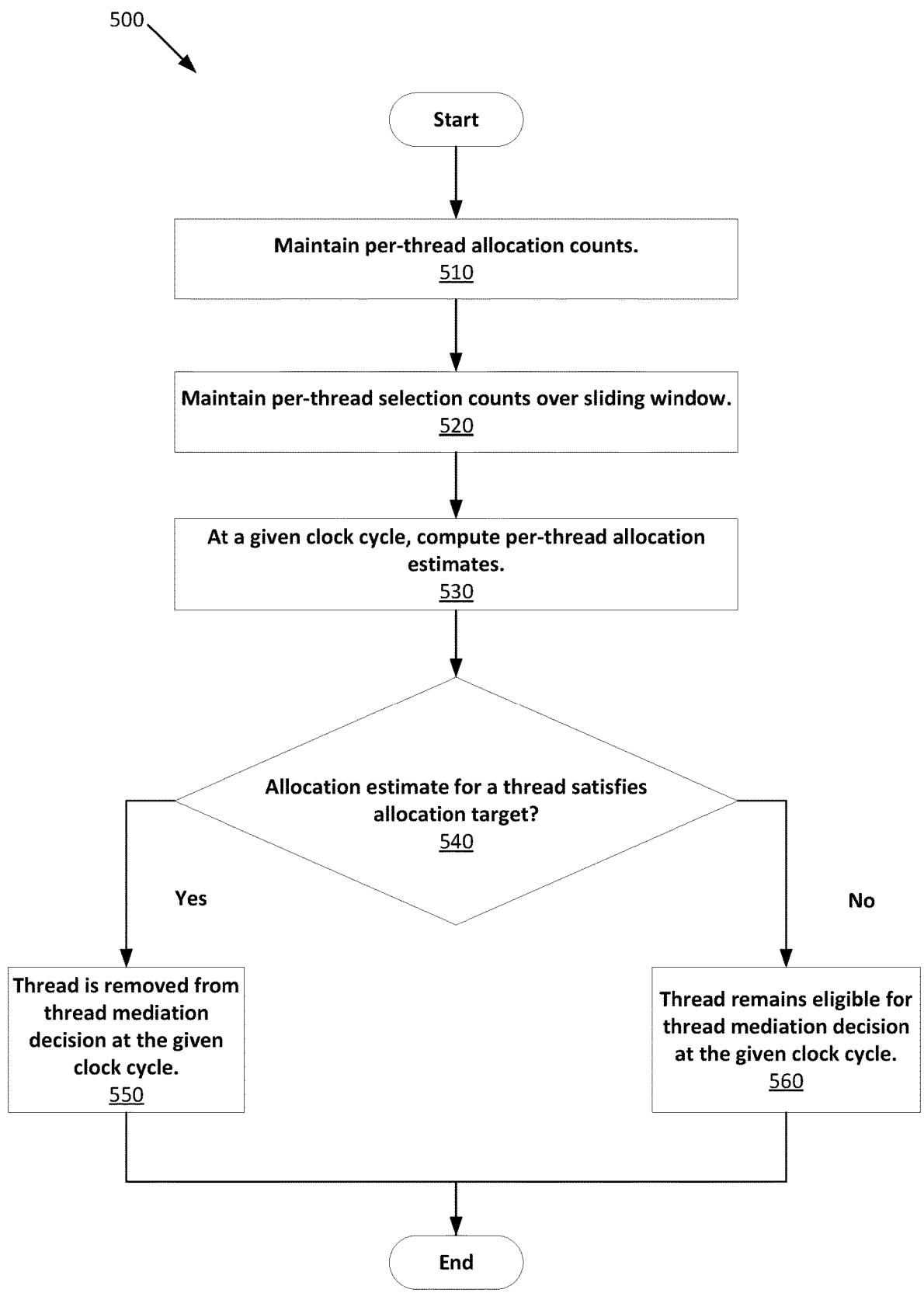
FIG. 5 is a flowchart of a software watermarking process, according to some possible implementations.

FIG. 5 depicts a flowchart of an example process for soft watermarking, according to some possible implementations. Much of the process 500 depicted in FIG. 5 is described elsewhere herein including with respect to the examples of FIG. 3 and FIG. 4. Therefore, for clarity, process 500 will be described primarily in a manner that the information it depicts differs from that described elsewhere herein.

Generally, FIG. 5 depicts the soft watermarking process for a set of threads competing or requesting to use a shared resource in a multithreaded microprocessor.

At operation 510, a per-thread allocation count is maintained for each thread in the set of threads for the shared resource. The per-thread allocation counts for the threads are updated at each clock cycle. The pre-thread allocation count for a thread at the current clock cycle reflects the number of entries in the shared resource allocated to the thread some number of clock cycles ago relative to a current clock cycle at which at thread mediation decision is made. When an entry is allocated in the shared resource to the thread, an updated allocation count for the thread includes the allocated entry. And when the entry is no longer allocated to the thread, an updated allocation count for the thread no longer includes the allocated entry.

It is possible for the per-thread allocation count for each thread in the set of threads to lag behind, by a number of clock cycles, the thread mediation decision at the current clock cycle. In this case, the per-thread allocation count for a thread at the current clock cycle may actually reflect the number of entries in the shared resource allocated to the thread at the number of clock cycles ago relative to the current clock cycle. Likewise, the number of entries allocated to a thread at the current clock cycle may be reflected by the per-thread allocation count for the thread at the number of clock cycles after the current clock cycle at which the thread mediation decision is made. To account for this lag, at operation 520, a per-thread selection count is maintained for each thread in the set of threads for the shared resource over a sliding past window. The per-thread selection count for a thread at the current clock cycle reflects the number of times during the current sliding past window at the current clock cycle that the thread was selected to use the shared resource. The per-thread selection counts are updated at each clock cycle and may encompass a past number of clock cycles (past window). For example, the past number of clock cycles of the sliding window may be equal to the number of clock cycles the per-thread allocation count lags behind the current clock cycle. For example, for the current clock cycle, the per-thread selection counts may encompass the past three clock cycles, not including the current clock cycle. As mentioned above, the selection count for a thread for the shared resource indicates how many times the thread was selected as a result of a thread mediation decision to use the shared resource in the current sliding window at the current clock cycle.

At operation 530, per-thread allocation estimates are computed at the current clock cycle for each thread in the set of threads. Operation 530 is performed at each clock cycle for each thread that is then eligible to be selected and has requested to use the shared resource. The allocation estimate for a thread is computed based on the allocation count for the thread and the selection count for the thread at the current clock cycle. For example, the allocation estimate for the thread may be computed as the sum of: (A) the allocation count for the thread at the current clock cycle and (B) the product of the selection count for the thread at the current clock cycle and an assumed per-selection allocation (e.g., two).

At operation 540, the allocation estimate computed for each thread at operation 530 is compared against an allocation target. The allocation target can be a global allocation or a per-thread allocation target. The allocation target can be statically defined or adjusted dynamically. If the allocation estimate computed for a thread satisfies an allocation target, then the thread is removed from the thread mediation decision at the current clock cycle such that the thread is not eligible to be selected to use the shared resource at the current clock cycle. On the other hand, if the allocation estimate computed for a thread does not satisfy an allocation target, then the thread remains eligible for the thread mediation decision at the current clock cycle such that the thread may be selected to use the shared resource at the current clock cycle. In this case, however, the thread may still be removed from the thread mediation decision at the current clock cycle for other reasons.

Conclusion

In the foregoing detailed description, possible implementations have been described with reference to numerous specific details that may vary from implementation to implementation. The detailed description and the figures are, accordingly, to be regarded in an illustrative rather than a restrictive sense.

A reference in the detailed description to a possible implementation or some possible implementations is not intended to mean that the implementation(s) is/are exclusive of another implementation or other implementations, unless the context clearly indicates otherwise. Thus, a described implementation may be combined with one or more other implementations in a particular combination, unless the context clearly indicates that the implementations are incompatible. Further, a described implementation is intended to illustrate by example and not by way of limitation.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the present disclosure. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

The invention claimed is:

1. A microprocessor comprising:
 a shared resource of a multithreaded microprocessor core, the shared resource having a plurality of entries for use by a plurality of threads; and
 wherein the multithreaded microprocessor core is configured to:
  determine an allocation estimate for a thread of the plurality of threads, wherein the allocation estimate is an estimate of the cardinality of a set of entries of the plurality of entries, that the thread will be allocated at a future clock cycle relative to a current clock cycle;
  determine whether the allocation estimate for the thread satisfies an allocation target, wherein the allocation target is the cardinality of a should-not-exceed number of entries that is allocated to the thread; and
  remove the thread from a thread mediation decision based on a determination that the allocation estimate for the thread satisfies the allocation target; and
 wherein the multithreaded microprocessor core is further configured to determine the allocation estimate based on:
  the cardinality of a set of entries, of the plurality of entries, that the thread was allocated at a clock cycle in the past relative to the current clock cycle; and
  a number of times the thread was selected to use the shared resource prior to the current clock cycle.

2. The microprocessor of claim 1, wherein the multithreaded microprocessor core is further configured to:
 determine the allocation estimate based on:
 a sum of:
  (a) the cardinality of a set of entries, of the plurality of entries, that the thread was allocated at the clock cycle in the past relative to the current clock cycle, and
  (b) a product of the number of times the thread was selected to use the shared resource prior to the current clock cycle, and a predefined number of entries.

3. The microprocessor of claim 1, wherein the shared resource has a total number of entries, and wherein the should-not-exceed number of entries is the total number of entries.

4. The microprocessor of claim 1, wherein the shared resource has a total number of entries, and wherein the should-not-exceed number of entries is less than the total number of entries.

5. The microprocessor of claim 1, wherein the multithreaded microprocessor core is further configured to:
 remove the thread from a thread mediation decision based on a determination that the allocation estimate for the thread equals an allocation target.

6. The microprocessor of claim 1, wherein the multithreaded microprocessor core is further configured to:
 remove the thread from a thread mediation decision based on a determination that the allocation estimate for the thread exceeds an allocation target.

7. The microprocessor of claim 1, wherein the multithreaded microprocessor core is further configured to:
 store an allocation count for each clock cycle of a plurality of clock cycles, the allocation count at each clock cycle of the plurality of clock cycles being the cardinality of a set of entries of the plurality of the entries allocated to the thread at a clock cycle in the past relative to the each clock cycle; and
 determine the estimate of the cardinality of the set of entries that the thread is allocated at the current clock cycle based on the allocation count at the current clock cycle.

8. The microprocessor of claim 1, wherein the multithreaded microprocessor core is further configured to:
 maintain a selection count over a sliding window of a plurality of clock cycles, the selection count at the current clock cycle being the number of times the thread was selected to use the shared resource prior to the current clock cycle; and
 determine the estimate of the cardinality of the set of entries that the thread is allocated at the current clock cycle based on the selection count at the current clock cycle.

9. A microprocessor comprising:
 a shared resource of a multithreaded microprocessor core, the shared resource having a plurality of entries for use by a plurality of threads; and
 wherein the multithreaded microprocessor core is configured to:
  determine an allocation estimate for each thread of the plurality of threads;
  wherein the allocation estimate for a thread is an estimate of the cardinality of the set of entries, of the plurality of entries, that the thread will be allocated at a future clock cycle relative to a current clock cycle;
  for each thread of the plurality of threads, determine if the allocation estimate for the thread satisfies an allocation target for the thread, wherein the allocation target for the thread is the cardinality of a should-not-exceed number of entries, of the plurality of entries, that is allocated to the thread; and
  for each thread of the plurality of threads, remove the thread from a thread mediation decision if the allocation estimate for the thread satisfies the allocation target and
 wherein the multithreaded microprocessor core is further configured to:
  for each thread of the plurality of threads, determine the allocation estimate for the thread based on a number of times the thread has been selected to use the shared resource.

10. The microprocessor of claim 9, wherein the multithreaded microprocessor core is further configured to:
 for each thread of the plurality of threads, determine the allocation target for the thread based on an allocation count for the thread.

11. The microprocessor of claim 9, wherein the multithreaded microprocessor core is further configured to:

for each thread of the plurality of threads, determine the allocation estimate for the thread based on an allocation count for the thread, wherein the allocation count for the thread reflects a number of entries of the plurality of entries allocated to the thread at a clock cycle prior to a clock cycle at which the thread mediation decision is made.

12. The microprocessor of claim 9, wherein the multithreaded microprocessor core is further configured to:

for each thread of the plurality of threads, determine the allocation estimate for the thread and based on an assumption of a number of entries of the plurality of entries the thread is expected to allocate if the thread is selected to use the shared resource.

13. The microprocessor of claim 9, wherein the multithreaded microprocessor core is further configured to:

for each thread of the plurality of threads, remove the thread from a thread mediation decision based on the allocation estimate satisfying the allocation target for the thread.

14. The microprocessor of claim 9, wherein the allocation target for each thread of the plurality of threads is statically configured.

15. The microprocessor of claim 9, wherein the allocation target for each thread of the plurality of threads is dynamically and automatically determined.

16. The microprocessor of claim 9, wherein the shared resource is a load queue, a reservation station, or a register file of the multithreaded microprocessor core.

17. The microprocessor of claim 9, further comprising:

a corresponding register, for each thread of the plurality of threads, for maintaining an allocation count for the thread;

a corresponding register, for each thread of the plurality of threads, for maintaining a selection count for the thread; and wherein the multithreaded microprocessor core is further configured to:

for each thread of the plurality of threads, determine the allocation estimate for the thread based on the corresponding register maintaining the allocation count for the thread and based on the corresponding register maintaining the selection count for the thread.

* * * * *